Sept. 8, 1970 J. ROUANET 3,527,598
PROCESS OF MAKING STEEL FROM PREREDUCED PRODUCTS
Filed Sept. 13, 1967
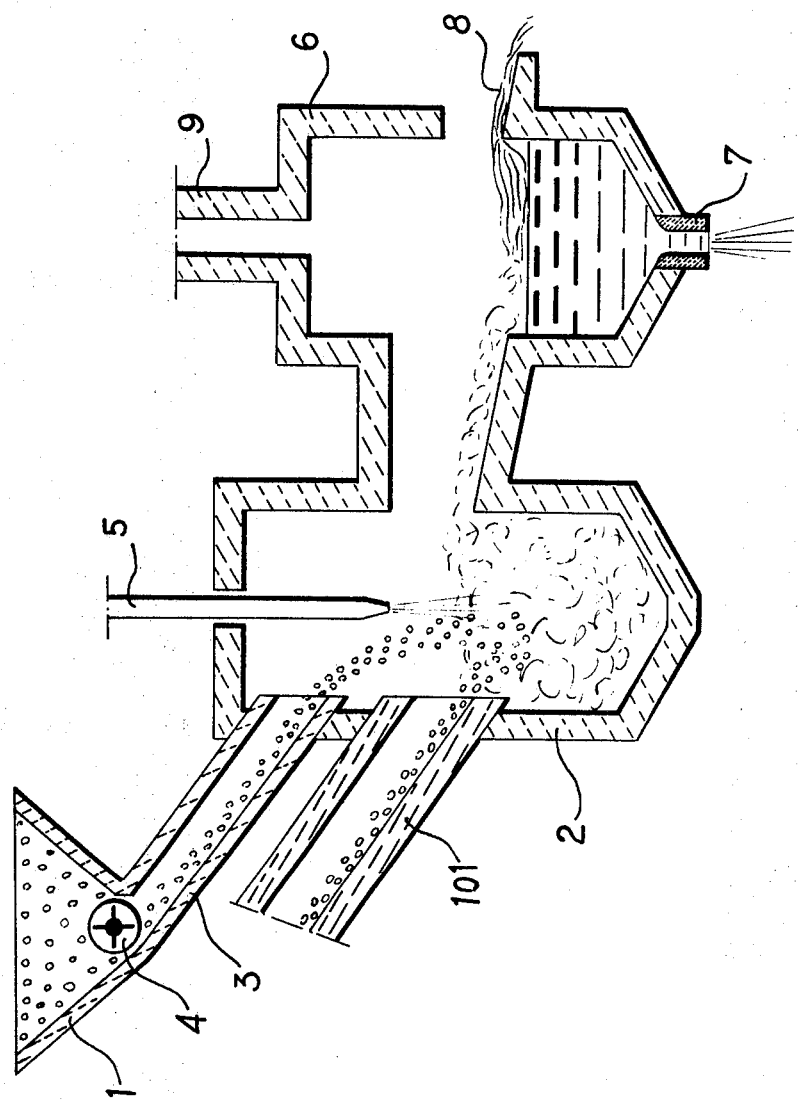

United States Patent Office 3,527,598
Patented Sept. 8, 1970

3,527,598
PROCESS OF MAKING STEEL FROM PREREDUCED PRODUCTS
Jean Rouanet, Metz, Moselle, France, assignor to Institut de Recherches de la Siderurgie Francaise, Saint-Germain-en-Laye, Yvelines, France
Filed Sept. 13, 1967, Ser. No. 667,473
Claims priority, application France, Sept. 28, 1966, 77,957
Int. Cl. C21c 5/32
U.S. Cl. 75—60    8 Claims

ABSTRACT OF THE DISCLOSURE

Steel is produced in a continuous process by continuously introducing into a refining vessel, containing a mixture of molten steel-forming materials, a solid prereduced steel-forming material at an elevated temperature below the melting point of said prereduced material; continuously introducing gaseous oxygen into said refining vessel and into the molten mass therein, in an amount sufficient to convert said continuously introduced prereduced steel-forming material into steel; and continuously withdrawing liquid steel from said refining vessel at such a rate that the amount of molten steel in said refining vessel remains substantially constant, the said solid prereduced steel-forming material being charged into the refining vessel partly in the form of pellets having a relatively high carbon content and partly in the form of pellets having a relatively low carbon content.

CROSS-REFERENCES TO RELATED APPLICATIONS

Ser. No. 515,807, steel-making process; applicants—Jean Raguin and Jean Rouanet; filed—Dec. 1, 1965, now abandoned; assigned to the same assignee as the present application.

BACKGROUND OF THE INVENTION

In the mentioned application of the present inventor it has been proposed to form steel in a continuous process from prereduced solid products. The proposal involved introducing continuously solid prereduced products into a mass of liquid metal, the prereduced products being at an elevated temperature and containing thermogenic elements in sufficient amounts to insure, upon combining with oxygen, the melting down of the solid products and their transformation into steel. At the same time, gaseous oxygen was introduced into the liquid metal and liquid metal was continously withdrawn in a manner to maintain this mass of liquid metal at a constant level.

In this application the disclosure of which is herein incorporated by reference, the prereduced products, in one embodiment were used in the form of pellets. The present invention has the purpose of improving the efficiency of the earlier process.

SUMMARY OF THE INVENTION

This object of an improvement of the earlier process is accomplished in the present case by introducing a solid prereduced steel-forming material in a continuous process into a refining vessel containing a mixture of molten steel-forming materials, the introduction being made at an elevated temperature below the melting point of the prereduced material; continuously introducing gaseous oxygen into the refining vessel and into the molten mass therein in an amount sufficient to convert the prereduced steel-forming mass into steel and continuously withdrawing molten steel from the refining vessel at such a rate that the amount of molten steel in said refining vessel remains substantially constant, the solid prereduced steel-forming material according to the specific feature of the present invention being charged into the vessel partly in the form of pellets having a relatively high carbon content and partly in the form of pellets having a relatively low carbon content.

BRIEF DESCRIPTION OF THE DRAWING

The single drawing shows, in a diagrammatic manner, a refining installation for the continuous feeding of pellets of prereduced iron in accordance with the teachings of the invention.

DESCRIPTION OF THE PREFERRED EMBODIMENTS

As stated, part of the prereduced iron pellets employed in the present invention has a high carbon content and another part has a low carbon content. The pellets with high carbon content may for instance contain from 10 to 25% carbon. The pellets with low carbon content may contain between 0.01 and 2% of carbon.

The total carbon content of the pellets must be such that the reaction with oxygen furnishes the required calories for accomplishing the melting and refining of all of the pellets present in the charge.

As has been indicated in the mentioned copending application, the prereduced solid material may consist of iron ores which have been submitted to a reducing treatment such that between about 40 and 100% of the oxygen present in the iron ore will have been removed by means of reducing agents such as, for instance, carbon. Processes of manufacturing such prereduced solid material are well known.

A particular advantage of the present invention resides in the fact that it is possible to introduce the carburized pellets while they are at elevated temperatures such as they come from a carburization installation. This will avoid the cost of reheating the pellets and will also eliminate all risk of a reoxidation of the pellets.

Another advantage of the invention is that a substantial portion of the prereduced iron pellets employed in the non-carburized condition can also be obtained directly from a pelletizing installation. In prior art processes use of pellets directly from the pelleting operation could only be made to minor extent. These non-carburized pellets can either be used ta the regular temperature or at an elevated temperature. It will be appreciated that in the latter case, the proportion of non-carburized pellets can be still more substantial and thus an additional increase of the production may be obtained.

The following is an example for the purpose only of illustrating the invention and not with any intention of restricting its scope. Reference is made to the attached drawing which in most of its parts is identical with the drawing of the copending case since the general features of the process are the same.

Prereduced non-carburized iron pellets were provided in a hopper 1. From there they were introduced into a refining vessel 2 by means of a duct 3. The output of the pellets was adjusted by means of a distribution screw 4.

Carburized, hot pellets are introduced into the vessel 2 through a duct 101 which is directly connected with the adjustable outlet of a carburization installation for iron pellets. This installation is not shown in the drawing in order not to encumber the figure.

A lance 5 permits introduction into the vessel 2 of a stream of oxygen which contains lime in suspension. The introduction of oxygen provides for the necessary refining operation. The heat of reaction caused by the oxidation of the carbon in the carburized pellets is sufficient to induce the melting of all of the pellets of the charge.

The refined metal intermixed with the slag forms a foamy mixture which, as in the copending case, is evacuated in a continuous process by overflow into a decanter or separatory vessel 6 where the slag phase is separated from the metal phase. The metal then is passed out through an opening 7 provided in the bottom of the vessel 6 while the slag which floated on top of the vessel is eliminated through opening 8.

The gases formed in the vessel 2 are driven off through the funnel 9 although the gases could also be used for preheating the non-carburized pellets according to a known process. A specific example of the invention is as follows.

EXAMPLE

In the vessel 2 there were introduced 440 kg. of pre-reduced and carburized pellets and 560 kg. of prereduced and non-carburized pellets per ton of metallic products charged into the furnace.

The carburized pellets were obtained directly from a carburizing installation and were at a temperature of 1000° C. Their composition was as follows:

|  | Percent |
|---|---|
| Fe metal | 70.5 |
| FeO | 1.4 |
| C | 22.0 |
| CaO | 0.4 |
| MgO | 1.5 |
| $SiO_2$ | 3.1 |
| $Al_2O_3$ | 0.8 |
| Diverse | 0.3 |

These non-carburized pellets were introduced at a temperature of 25° C. Their composition was as follows:

|  | Percent |
|---|---|
| Fe metal | 92 |
| FeO | 1.9 |
| C | 0.16 |
| CaO | 0.9 |
| MgO | 1.3 |
| $SiO_2$ | 2.5 |
| $Al_2O_3$ | 0.6 |
| Diverse | 0.6 |

110 standard m.³ of oxygen and 60 kg. of powdered lime were then introduced per ton of metallic charge through the lance 5. A crude steel was thus obtained of the following composition:

|  | Percent |
|---|---|
| C | 0.062 |
| P | 0.010 |
| S | 0.009 |
| Mn | 0.032 |

The steel produced was at a temperature of 1000° C.

The slag formed in the process had the following composition:

|  | Percent |
|---|---|
| FeO | 30 |
| CaO | 39 |
| MgO | 11 |
| $SiO_2$ | 17 |
| Diverse | 3 |

The gases which were driven off at a temperature of 1600° C. from the refining vessel contained 85% of carbon monoxide and 15% of carbon dioxide.

What is claimed as new and desired to be secured by Letters Patent is:

1. In a method of producing steel by continuously introducing into a refining vessel, containing a mixture of molten steel-forming materials, a solid pre-reduced steel-forming material at an elevated temperature below the melting point of said pre-reduced material; continuously introducing gaseous oxygen into said refining vessel and into the molten mass therein, in an amount sufficient to convert said continuously introduced pre-reduced steel-forming material into steel; and continuously withdrawing liquid steel from said refining vessel at such a rate that the amount of molten steel in said refining vessel remains substantially constant, the improvement comprising charging the said solid pre-reduced steel-forming material into the refining vessel partly in the form of pellets having a relatively high carbon content between about 10% and 25% and partly in the form of pellets having a relatively low carbon content between about 0.01% and 2%.

2. The process of claim 1, wherein the total carbon content introduced with said pellets is sufficient to furnish the necessary calories for the melting down and refining of all of the pellets in said charge.

3. The process of claim 1, wherein the pellets with high carbon content are in the form and at the temperature as received from a carburizing installation.

4. The process of claim 1, wherein pellets with low carbon content are in the form and at the temperature as received from a pelletizing installation.

5. The process of claim 4, wherein the pellets with low carbon content are subjected to a preheating treatment to introduce them at an elevated temperature.

6. The process of claim 1, wherein the pellets of high carbon content are introduced at a temperature of about 1000° C.

7. The process of claim 1, wherein the pellets having a low carbon content are introduced at a temperature of about 25° C.

8. An improvement in a method of producing steel by continuously introducing into a refining vessel, containing a mixture of molten steel-forming materials, a solid prereduced steel-forming material at an elevated temperature below the melting point of said prereduced material; continuously introducing gaseous oxygen into said refining vessel and into the molten mass therein, in an amount sufficient to convert said continuously introduced prereduced steel-forming material into steel; and continuously withdrawing liquid steel from said refining vessel at such a rate that the amount of molten steel in said refining vessel remains substantially constant, the said improvement comprising charging the said solid prereduced steel-forming material in the form partly of pellets having a carbon content between about 10 and 25% and partly in the form of pellets having a carbon content between about 0.01 and 2% and charging the said high carbon content pellets at a relatively high temperature and charging the said low carbon content pellets at a relatively low temperature, and providing for a total carbon content in said pellets sufficient to furnish the necessary calories for melting down and refining all of said pellets in said charge after introduction into the refining vessel.

References Cited

UNITED STATES PATENTS

| 2,806,779 | 9/1957 | Case | 75—38 X |
| 2,978,318 | 4/1961 | Kalling et al. | 75—51 X |
| 3,340,044 | 9/1967 | MacAfee et al. | 75—38 X |
| 3,356,490 | 12/1967 | Muller et al. | 75—60 |

L. DEWAYNE RUTLEDGE, Primary Examiner

GEORGE K. WHITE, Assistant Examiner

U.S. Cl. X.R.

75—46